UNITED STATES PATENT OFFICE.

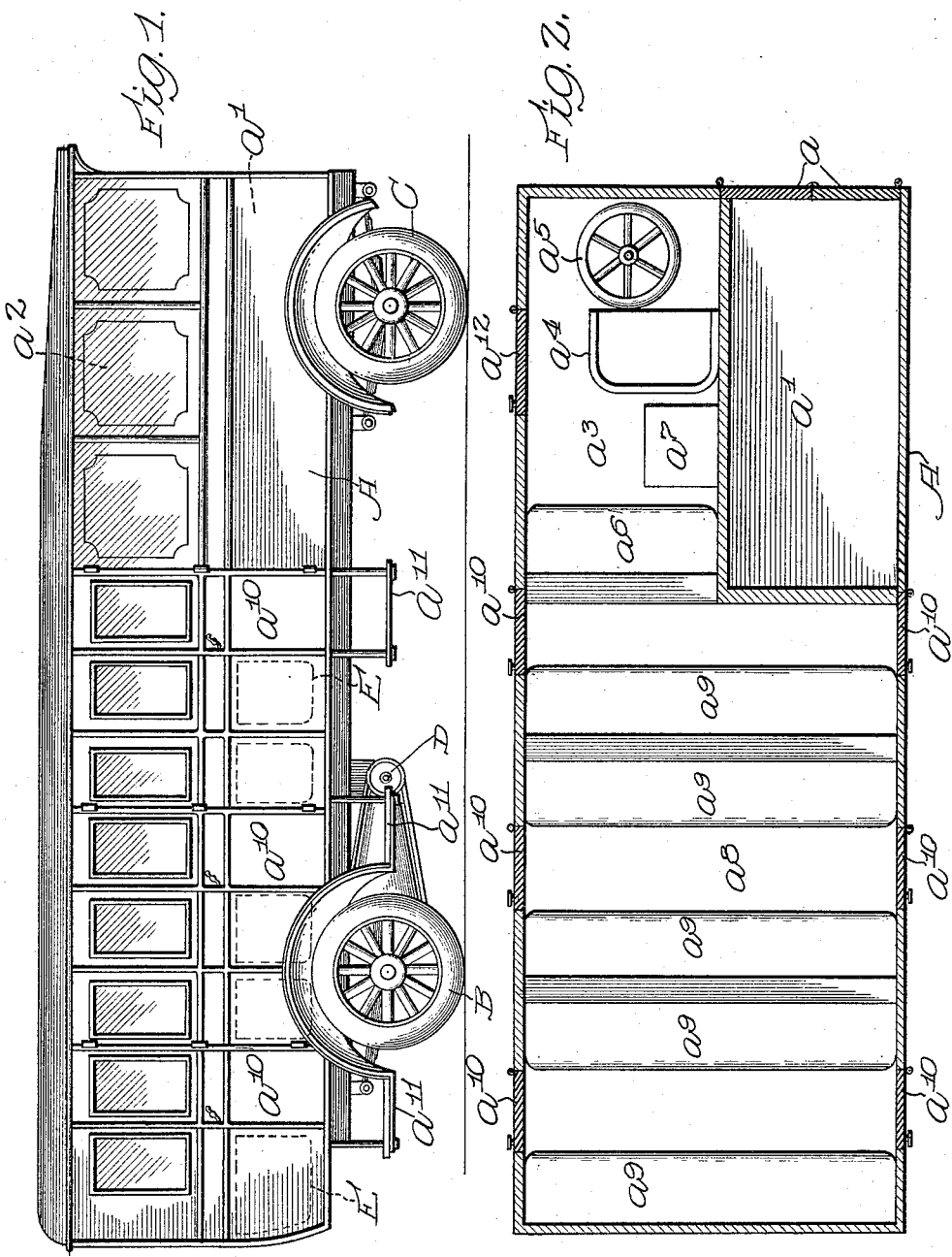

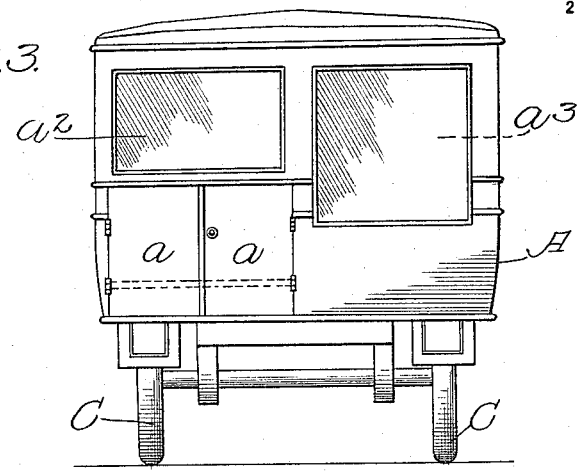
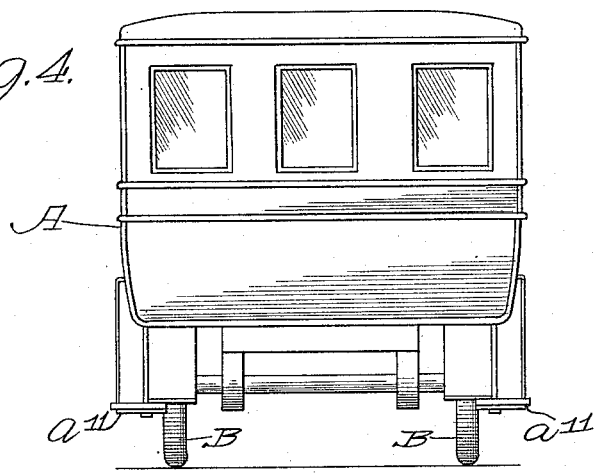
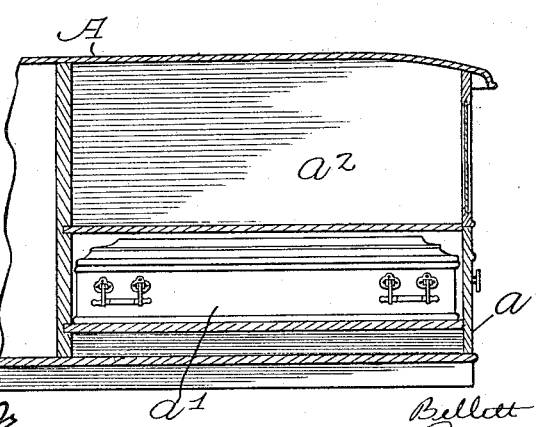

BELLETT LAWSON, JR., OF RIVER GROVE, ILLINOIS, ASSIGNOR OF ONE-HALF TO JAMES P. SHERLOCK, OF CHICAGO, ILLINOIS.

FUNERAL-COACH.

1,149,161.  Specification of Letters Patent.  Patented Aug. 3, 1915.

Application filed April 6, 1912.  Serial No. 688,873.

*To all whom it may concern:*

Be it known that I, BELLETT LAWSON, Jr., a citizen of the United States of America, and resident of River Grove, Cook county, Illinois, have invented a certain new and useful Improvement in Funeral-Coaches, of which the following is a specification.

My invention relates to funeral coaches in general, but more particularly to those in which provision is made for carrying both passengers and casket, and especially those which are self-propelled.

Generally stated, the object of my invention is to provide a novel and satisfactory funeral coach for use in carrying both passengers and casket to the cemetery or place of interment, having the dignity and characteristics essential for a hearse, and yet suitable for passenger service both going and coming.

Special objects are to provide a coach of this character in which the casket is disposed lengthwise at the forward end thereof; to provide a comparatively large seating capacity within a relatively small space at the rear of the closed compartment set aside for the casket; and to provide certain details and features of construction tending to make a coach of this kind conform as nearly as possible to established custom and the ideas of the public on this subject.

To these and other useful ends my invention consists in matters hereinafter set forth and claimed.

In the accompanying drawings, Figure 1 is a side elevation of a funeral coach embodying the principles of my invention. Fig. 2 is a plan of the interior of said coach. Fig. 3 is a front end view of said coach. Fig. 4 is a rear end view of said coach. Fig. 5 is a detail longitudinal vertical section through the lower casket compartment and upper flower space at the forward end of said coach.

As thus illustrated, my invention comprises a body A having rear propelling wheels B and front steering wheels C. The said body is constructed with front doors $a$ leading to a casket compartment $a'$ in which the casket may rest lengthwise of the direction of travel, which conforms to the preferred custom. The space $a^2$ above said casket compartment $a'$ is reserved for flowers. A full height space or compartment $a^3$ is located at the left-hand side of the casket compartment, and is provided with a driver's seat $a^4$ and steering wheel $a^5$ at the front. At the rear of this space $a^3$ a seat $a^6$ and desk $a^7$ are provided for the undertaker and minister. Behind the compartments $a'$ and $a^3$ there is a large passenger compartment $a^8$ provided with cross seats $a^9$ facing toward each other, arranged in pairs, and with side doors $a^{10}$ which afford ingress and egress for the members of the funeral party. Side steps $a^{11}$ are provided for said doors, and the compartment $a^3$ has a side door $a^{12}$ at the left-hand side of the coach. The coach thus constructed is driven by electricity. For this purpose a motor D is provided and suitably connected with the wheels B. Current is supplied from storage batteries E under the seats $a^9$ in the rear passenger compartment.

Thus it will be seen that by my invention I provide a commodious and yet compact vehicle for use in conducting funerals. The coach is suitable for use going and coming— that is, for carrying the funeral party to and from the cemetery. The construction and location of the motive power makes it possible to have the casket compartment in front, and in this way the casket is always lengthwise of the coach, and with the foot thereof in front. This, as stated, is in accordance with the custom which is averse to having the casket extend crosswise. Consequently, my invention conforms very closely to the ideas of long standing on this subject.

The casket compartment $a'$ is, of course, inclosed all around, and the flower compartment $a^2$ is inclosed all around with glass. The compartment $a^3$ is, however, open at the rear, and communicates with the passenger compartment, whereby services may be held in the coach.

What I claim as my invention is:—

1. A funeral coach comprising a body provided at the forward end thereof with a casket compartment in which the casket is disposed longitudinally of the coach, a door for the front end of said compartment, a passenger compartment in rear of said casket compartment, and a flower space above said casket compartment, inclosed all around with glass, separated from said passenger compartment, together with a driver's space at one side of said casket compartment and flower space.

2. A funeral coach comprising a body provided at the forward end thereof with a casket compartment in which the casket is disposed longitudinally of the coach, a door for said compartment, a passenger compartment in rear of said casket compartment, a fixed wall permanently separating said compartments, means for driving said coach, and a flower space above said casket compartment, inclosed all around, separated from said passenger compartment, together with an inclosed driver's space at one side of said casket compartment and flower space.

3. A funeral coach comprising a body provided at the forward end thereof with a casket compartment in which the casket is disposed longitudinally of the coach, a door for the front end of said compartment, a passenger compartment in rear of said casket compartment, and a flower space above said casket compartment, inclosed all around with glass, separated from said passenger compartment, together with a driver's space at one side of said casket compartment and flower space, said driver's space having a rear opening into said passenger compartment.

4. A funeral coach comprising a body provided at the forward end thereof with a casket compartment in which the casket is disposed longitudinally of the coach, an outside door for said compartment, a passenger compartment, a fixed wall permanently separating said compartments, means for driving said coach, and a flower space above said casket compartment, inclosed all around, separated from said passenger compartment, together with a driver's space at one side of said casket compartment and flower space, said driver's space having a rear opening into said passenger compartment at one side of the longitudinal center line of the coach.

5. A funeral coach comprising a body provided at the forward end thereof with a casket compartment in which the casket is disposed longitudinally of the coach, at one side thereof, a door for the front end of said compartment, a passenger compartment in rear of said casket compartment, and a flower space above said casket compartment, inclosed all around with glass, separated from said passenger compartment, together with a driver's space at one side of said casket compartment and flower space, said passenger compartment having doors only at the opposite sides thereof, and the combined width of said casket compartment and driver's space being the same as the width of said passenger compartment.

6. A funeral coach comprising a body provided at the forward end thereof with a casket compartment in which the casket is disposed longitudinally of the coach, an outer door for said compartment, affording access to said compartment from the street, a passenger compartment in rear of said casket compartment, and a flower space above said casket compartment, inclosed all around, separated from said passenger compartment, together with a driver's space at one side of said casket compartment and flower space, said passenger compartment extending the full width of the body, and having entrance and exit doors only at the opposite sides thereof.

7. A funeral coach comprising a body provided at the forward end thereof with a casket compartment in which the casket is disposed longitudinally of the coach, a door for the front end of said compartment, a passenger compartment in rear of said casket compartment, and a flower space above said casket compartment, inclosed all around with glass, separated from said passenger compartment, together with a driver's space at one side of said casket compartment and flower space, said driver's space having a side door, and seats in said driver's space, one of said seats separating the driver's space from the passenger compartment.

8. A funeral coach comprising a body provided at the forward end thereof with a casket compartment in which the casket is disposed longitudinally of the coach, at the right hand side thereof a door for said compartment, a passenger compartment in rear of said casket compartment, and a flower space above said casket compartment, inclosed all around, separated from said passenger compartment, together with a driver's space at the left of said casket compartment and flower space, said driver's space having a side door, and seats in said driver's space, one of said seats separating the driver's space from the passenger compartment, and said passenger compartment being in communication with said driver's space above said seat.

Signed by me at Chicago Illinois this 3rd day of April 1912.

BELLETT LAWSON, Jr.

Witnesses:
J. NORBY,
E. H. CLEGG.